United States Patent
Nadkarni (10) Patent No.: US 7,617,497 B1
(45) Date of Patent: Nov. 10, 2009

(54) METHOD AND SYSTEM FOR CREATING AND USING STORAGE THREADS

(75) Inventor: Sanjay G. Nadkarni, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 976 days.

(21) Appl. No.: 10/929,902

(22) Filed: Aug. 30, 2004

(51) Int. Cl.
*G06F 9/46* (2006.01)

(52) U.S. Cl. ............................ 718/102; 718/100
(58) Field of Classification Search ............. 718/102, 718/104, 1, 100
See application file for complete search history.

(56) References Cited

U.S. PATENT DOCUMENTS

| | | | | |
|---|---|---|---|---|
| 5,204,965 | A * | 4/1993 | Guthery et al. ............. | 718/102 |
| 5,774,358 | A * | 6/1998 | Shrote ........................ | 700/86 |
| 5,857,184 | A * | 1/1999 | Lynch ......................... | 707/4 |
| 6,125,382 | A * | 9/2000 | Brobst et al. ............... | 718/102 |
| 6,411,983 | B1 * | 6/2002 | Gallop ....................... | 718/104 |
| 6,691,304 | B1 * | 2/2004 | Zhang et al. ............... | 717/127 |
| 6,708,197 | B1 * | 3/2004 | Ryu et al. .................. | 718/103 |
| 6,910,209 | B2 * | 6/2005 | Kawahara et al. ......... | 718/102 |
| 7,036,124 | B1 * | 4/2006 | Patterson .................. | 718/104 |
| 7,171,663 | B2 * | 1/2007 | Moore et al. .............. | 718/1 |
| 7,206,805 | B1 * | 4/2007 | McLaughlin, Jr. ......... | 709/203 |
| 7,234,139 | B1 * | 6/2007 | Feinberg ................... | 718/1 |
| 7,277,938 | B2 * | 10/2007 | Duimovich et al. ....... | 709/224 |
| 2002/0046230 | A1 * | 4/2002 | Dieterich et al. ......... | 709/107 |
| 2002/0095423 | A1 * | 7/2002 | Dessloch et al. ......... | 707/100 |
| 2002/0145924 | A1 * | 10/2002 | Beckwith ................. | 365/200 |
| 2003/0056199 | A1 * | 3/2003 | Li et al. .................... | 717/127 |
| 2003/0056200 | A1 * | 3/2003 | Li et al. .................... | 717/128 |
| 2003/0217171 | A1 * | 11/2003 | Von Stuermer et al. ... | 709/231 |
| 2004/0019679 | A1 * | 1/2004 | E et al. ..................... | 709/226 |
| 2005/0229176 | A1 * | 10/2005 | Findeisen ................. | 718/100 |
| 2005/0273783 | A1 * | 12/2005 | Tankov et al. ............ | 718/100 |
| 2007/0094665 | A1 * | 4/2007 | Jackson .................... | 718/104 |

OTHER PUBLICATIONS

Bortvedt (Functional Specification for object caching service for Java (OCS4J),2.0, May-Jun. 2004, pp. 1-27).*
Golding et al ("Attribute-managed storage", Hewlett-Packard company, 1995, pp. 1-4).*

* cited by examiner

*Primary Examiner*—Meng-Ai An
*Assistant Examiner*—Caroline Arcos
(74) *Attorney, Agent, or Firm*—Osha • Liang LLP (57) ABSTRACT

A system including a plurality of data units, wherein each of the plurality of data units is associated with a data thread, a plurality of storage engines configured to store the plurality of data units, and a data scheduler configured to schedule an action to perform on the plurality of data units using the data thread associated with each of the plurality of data units, wherein the data thread includes a data thread duration and a plurality of tuples, and wherein each of the plurality of tuples includes an attribute and an attribute duration.

21 Claims, 5 Drawing Sheets

METHOD AND SYSTEM FOR CREATING AND USING STORAGE THREADS

BACKGROUND

Typically, data is stored using a storage management concept, such as a file system. The storage management concept is focused on providing data availability, and data reliability (i.e., detecting corrupted data, replication of data, providing data correction, etc.). Additionally, data is conceptualized and stored as files or blocks of logical objects that reside within data storage. For example, in a file system, data is stored on physical disks or tapes in the form of files or blocks.

When data is conceptualized in this manner, the state of data (e.g., access times, data size, read/write access, etc.) is managed by the storage management device (e.g., a file system). Additionally, the reliability of data within the storage management device is typically handled using a variety of schemes, such as hierarchical storage management (HSM) devices and redundant arrays of inexpensive (or independent) disks (RAID).

Using the aforementioned types of data storage, the various data attributes (e.g., state of data and reliability of data) is separated by the mechanisms that handle these attributes. For example, data attributes in a file system are stored as part of the metadata associated with files rather than as part of the actual data. In some instances, this may cause attributes to be lost when data is moved from one storage management device to another.

SUMMARY

In general, in one aspect, the invention relates to a system comprising a plurality of data units, wherein each of the plurality of data units is associated with a data thread, a plurality of storage engines configured to store the plurality of data units, and a data scheduler configured to schedule an action to perform on the plurality of data units using the data thread associated with each of the plurality of data units, wherein the data thread comprises a data thread duration and a plurality of tuples, and wherein each of the plurality of tuples comprises an attribute and an attribute duration.

In general, in one aspect, the invention relates to a method for creating a data thread comprising storing a data unit, populating the data thread with an attribute, assigning an attribute duration to the attribute, and assigning a data thread duration to the data thread.

In general, in one aspect, the invention relates to a method for using a data thread comprising obtaining the data thread, determining whether the data thread is expired, and scheduling the data thread on an appropriate storage engine if the data thread is not expired, wherein the data thread is scheduled on the appropriate storage engine based on at least one of a plurality of attributes.

In general, in one aspect, the invention relates to a computer system for correcting an error in a first block, comprising a processor, a memory, a storage device, and software instructions stored in the memory for enabling the computer system under control of the processor, to obtain the data thread, determine whether the data thread is expired, and schedule the data thread on an appropriate storage engine if the data thread is not expired, wherein the data thread is scheduled on the appropriate storage engine based on at least one of a plurality of attributes.

In general, in one aspect, the invention relates to a network system having a plurality of nodes comprising a plurality of data units, wherein each of the plurality of data units is associated with a data thread, a plurality of storage engines configured to store the plurality of data units and each associated data thread, and a data scheduler configured to schedule an action to perform on the plurality of data units using the data thread associated with each of the plurality of data units, wherein each of the plurality of storage engines is located on any one of the plurality of nodes, and wherein the data scheduler is located on any one of the plurality of nodes.

In general, in one aspect, the invention relates to a plurality of nodes, comprising a plurality of data units, wherein each of the plurality of data units is associated with a data thread, a plurality of storage engines configured to store the plurality of data units, and a data scheduler configured to schedule an action to perform on the plurality of data units using the data thread associated with each of the plurality of data units, wherein the data thread comprises a data thread duration and a plurality of tuples, wherein each of the plurality of tuples comprises an attribute and an attribute duration, wherein each of the plurality of data units resides on at least one of the plurality of nodes, wherein each of the plurality of storage engines resides on at least one of the plurality of nodes, and wherein the data scheduler resides on at least one of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to creating and using data threads. One or more embodiments of the invention relate to providing a way to associate attributes with data using a data thread. One or more embodiments of the invention use data threads including data attributes that are linked to corresponding data units. One or more embodiments of the invention provide the ability to perform actions on the data based on the attributes in the associated data threads.

Figure 1:
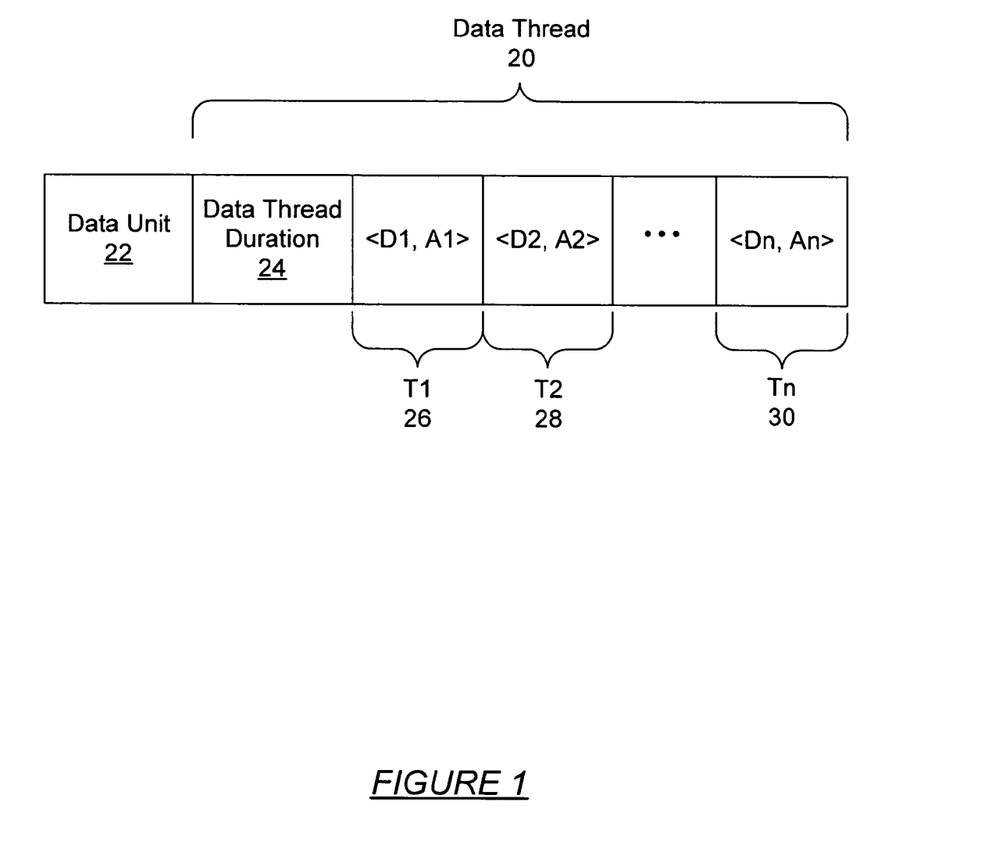
FIG. 1 shows a data thread in accordance with an embodiment of the invention.

FIG. 1 shows a data thread (20) in accordance with an embodiment of the invention. The data thread is associated with and linked to a data unit (22). The data thread (20) includes a data thread duration (24), and at least one tuple (i.e., T1 (26), T2 (28), Tn (30)). In one embodiment of the invention, each tuple (26, 28, 30) of the data thread (20) includes an attribute (i.e., A1-An) characterizing the data unit and an attribute duration (i.e., D1-Dn). In one embodiment of the invention, the attribute may include the name of the data unit (22), a universal identifier (ID) to identify the data unit, a parent that provides linkage for the data unit (22), an owner of the data unit (22), a security attribute, a quality of service attribute that defines the service level provided to users of the data unit (22), etc. One skilled in the art will appreciate that there may be several other attributes that may be defined to characterize a data unit.

In one embodiment of the invention, the parent attribute mentioned above links data units with associated parent data. For example, if a data unit is a portion of a file, then the parent attribute links the portion of a file with the entire file from which the portion is taken. This attribute may be used, for example, when data is partitioned and stored in different storage engines (i.e., hard disk, disk drive, random access memory, etc.). More specifically, if some portions of data need to be on a high speed storage engine, and other portions of data may not need a high speed storage engine, then the parent attribute links the partitioned data, even though the data may be distributed across different physical locations.

The security attribute may provide information regarding the permissions associated with the data unit. For example, read/write permissions may be specified by this attribute. Permissions may also change during the life of the data thread. In one embodiment of the invention, the security attribute may also specify encryption and decryption algorithms used to protect the associated data unit from tampering, modifying, etc. The security attribute may also be used for other data reliability issues, such as error checking and error correcting mechanisms.

In one embodiment of the invention, the quality of service attribute is a set of parameters and procedures associated with a service or a user. Specifically, the quality of service attribute indicates the capabilities and constraints related to a delivery of a service to a user. For example, the quality of service attribute may include the speed, availability, modifiability, reliability, or usability of a data unit. The quality of service attribute enables a service provider to provide different levels of service based on the user's needs. For example, quality of service attributes are used in network environments, where network service providers use the quality of service attributes to establish different levels of service based on a user's traffic throughput, traffic loss, and response time. Moreover, the network service provider is able to charge users for the actual level of service provided.

As noted above, each tuple (26, 28, 30) within the data thread (20) includes an attribute and an attribute duration (not shown). In one embodiment of the invention, the total thread duration (24) may be divided into several attribute durations. In this manner, the attribute durations may sum to equal the total thread duration. In one embodiment of the invention, some attributes such as owner, name, ID, etc., may not have a duration. These attributes describe the data unit (22) associated with the data thread (20) and may exist as long as the data thread (20) is active (i.e., not expired). Typically, these attributes do not change during the life of the data thread (20), although the possibility of assigning a new name, owner, or ID to a data thread (20) may occur. In contrast, attributes such as security, quality of service, etc., typically include durations and may be changed at any time to reflect various services for which the data unit (22) is being used.

Figure 2:
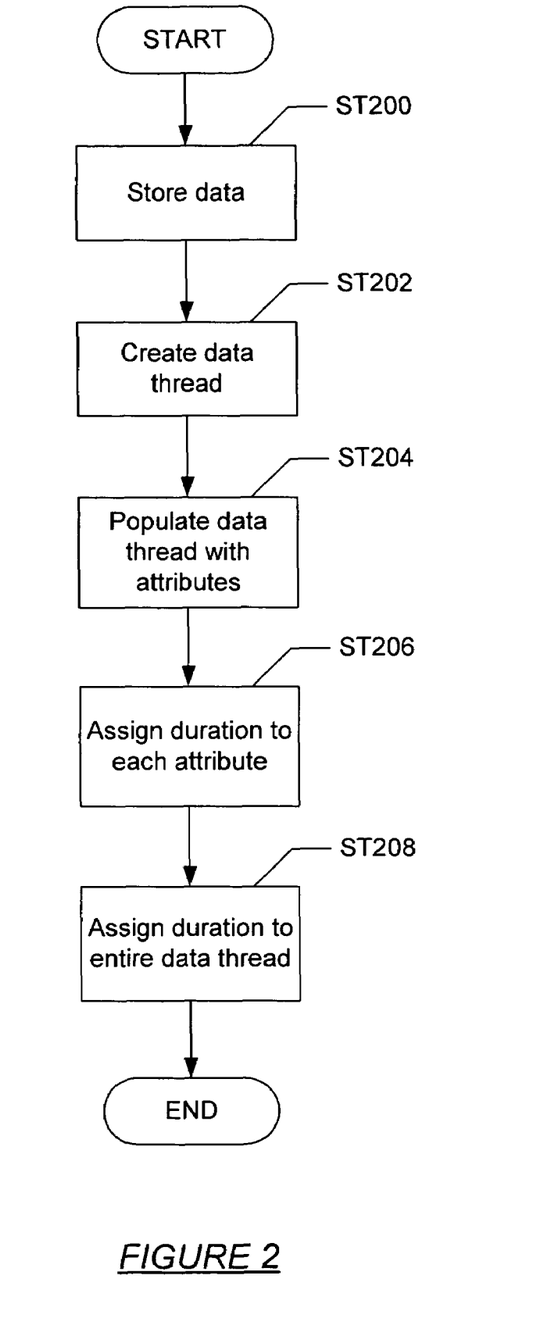
FIG. 2 shows a flow chart for creating data threads in accordance with an embodiment of the invention.

FIG. 2 shows a flow chart for creating a data thread in accordance with one embodiment of the invention. Initially, a data unit is stored in the storage management device (e.g., a block of data may be stored in a file system) (Step 200). Storing the data unit initiates the creation of an associated data thread (Step 202). Subsequently, the data thread is populated with attributes (Step 204). Attributes may be any of the aforementioned characteristics which describe, or are associated with, the data unit. At this stage, each attribute in the data thread may be assigned a duration (Step 206). The duration may be any length of time for which that particular attribute is active (i.e., alive). One skilled in the art will appreciate that once the duration of an attribute expires, the attribute is no longer active. Additionally, attribute durations may be changed at any time during the data thread life. Once each attribute is given a duration, the entire data thread is also assigned a duration (Step 208). Once the data thread duration expires, the data thread and the associated data unit no longer exist. One skilled in the art will appreciate that attributes may also be added at any time during the data thread life.

Figure 3:
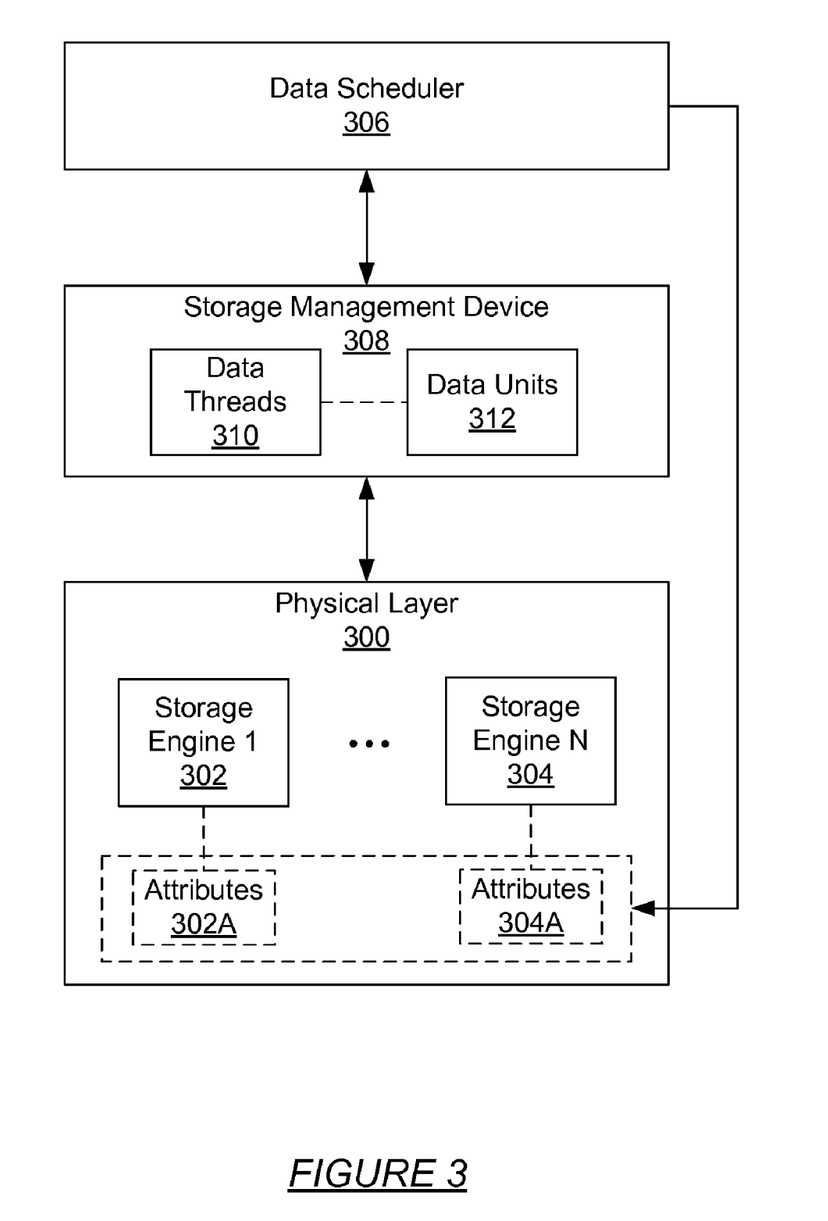
FIG. 3 shows a system in accordance with an embodiment of the invention.

In one embodiment of the invention, data threads may be used in a system as shown in FIG. 3. Specifically, the system includes a physical layer (300) with multiple storage engines (i.e., Storage Engine 1 (302), Storage Engine N (304)), a data scheduler (306), and a storage management device (308). In one embodiment of the invention, the system shown in FIG. 3 is used to create, manage, and process data threads that are associated with various data units. Additionally, data threads associated with data units may reside anywhere in the system. In one embodiment of the invention, data threads may be stored with the data unit associated with the data thread. Alternatively, data threads may reside separately from the associated data units. One skilled in the art will appreciate that the physical layers of the system shown in FIG. 3 may reside in a computer system or in a distributed network, with a storage management device and a data scheduler interfacing with the computer system.

In one embodiment of the invention, when a data unit (312) is stored in the storage management device (308), a data thread (310) is created that is associated with and linked to the data unit (312). In one embodiment of the invention, a data unit may be a file, a portion of a file, a file system, a block, a segment, a byte, a word, and a double word, etc. The data unit may depend on the storage management system. For example, a file system may store data in the form of a file or data blocks. In this case, a data unit may be one file, a portion of a file, or a data block.

Returning to FIG. 3, as mentioned above, the physical layer (300) of the system includes one or more storage devices (302, 304). In one embodiment of the invention, a storage device may be a hard disk, a remote disk, a random access memory, a non-volatile random access memory, a small computer system interface (SCSI) storage, or any other area of storage in a system. Further, each storage engine (302, 304) may also include attributes (302A, 304A) that completely describe the storage engine (302, 304). In one embodiment of the invention, storage engine attributes may include the size of the storage engine, the available space within the storage engine, the quality of service that the storage engine provides, etc. The quality of service attribute for a storage device may include RAID level provided, bandwidth of the storage engine, latency of the storage engine, distance (e.g., for Internet SCSI storage), etc.

In one embodiment of the invention, the data scheduler (306) includes the functionality to schedule data threads for particular actions (on the data unit) based on the attributes associated with the data thread. An action to be performed on a data unit may include moving the data unit to a particular storage engine, changing the duration of the data thread, changing the duration of an attribute, destroying the data thread and data unit if the duration has expired, etc. In order to determine which actions to perform on a particular data unit or how to schedule the data thread associated with the data unit, the data scheduler (8) may use the attributes within the data thread and the attributes associated with each storage engine.

In one embodiment of the invention, the data scheduler may use a particular attribute associated with a data unit to determine what type of action to perform on the data unit or how to schedule the data thread associated with the data unit. For example, if each attribute associated with a data unit is prioritized within the data thread, then the data scheduler may schedule the data unit based on the attribute with the highest priority. Alternatively, the data scheduler may use any combination of attributes to determine how to schedule a data thread. In one embodiment of the invention, the data scheduler may schedule data threads by using the attributes associated with the storage engines. For example, if a data thread specifies an attribute that requires a data unit to be scheduled on a high speed storage engine, then the attributes associated with the storage engines would be used to schedule the data thread on a high speed storage engine. One skilled in the art will appreciate that the data scheduler may reside within the storage management device.

Figure 4:
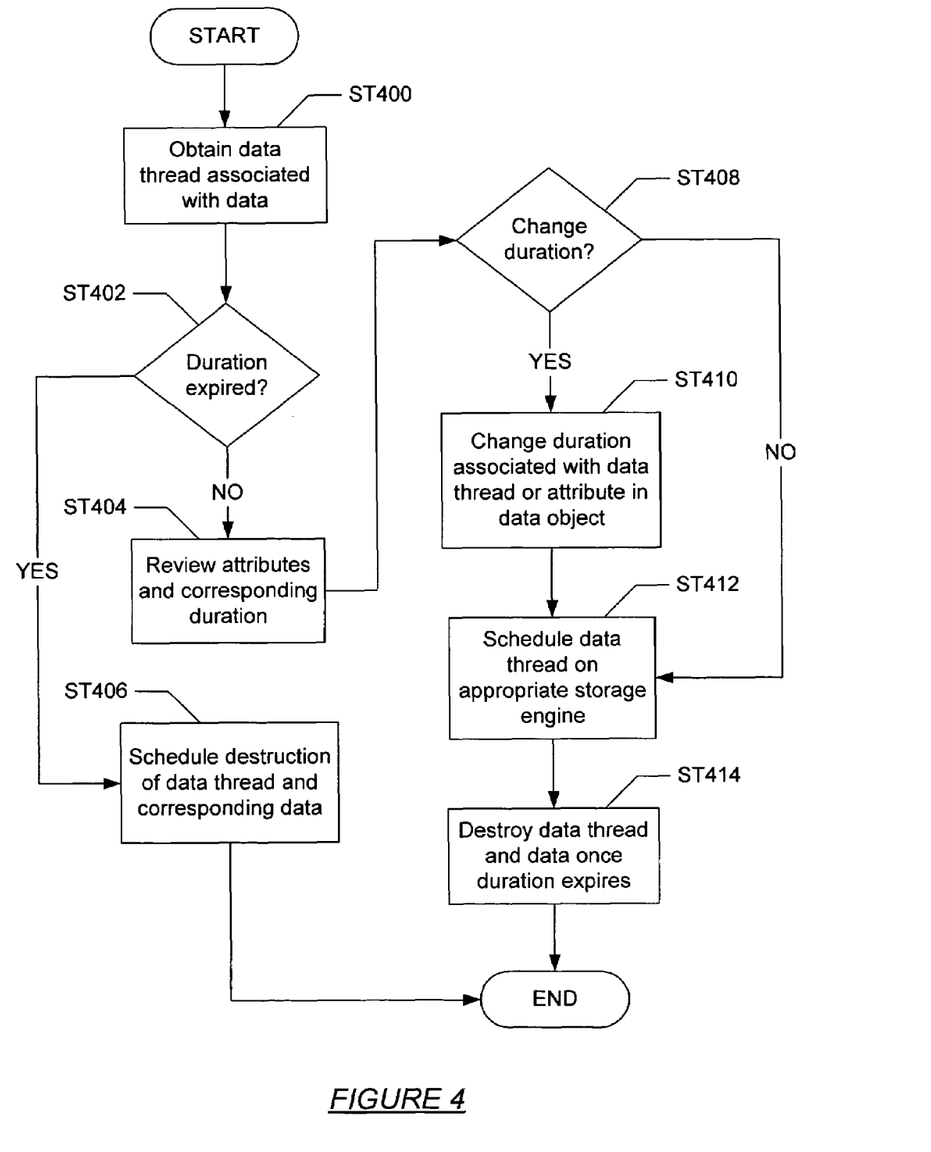
FIG. 4 shows a flow chart for using data threads in accordance with an embodiment of the invention.

FIG. 4 shows a flow chart for using data threads in accordance with an embodiment of the invention. Initially, a data thread associated with a data unit is obtained by a data scheduler (Step 400). At this stage, the data scheduler determines whether the data thread has expired (Step 402). If the data thread is already expired (i.e., the duration of the data thread is expired), then the data scheduler may schedule the destruction of the data thread and the associated data unit (Step 406). This allows the data management device to reclaim the space corresponding to the expired data thread and associated data unit. In one embodiment of the invention, reclamation of space within the storage management device may be performed by a low priority thread running in the background of the storage management device. For example, a low priority thread may place any free space on storage engines back into the allocation resource of the storage management device.

In one embodiment of the invention, if the data thread is not expired, then the data scheduler may review the attributes of the data thread, the duration of each attribute within the data thread, and the attributes of the storage engines associated with the storage management device (Step 404). The attributes and durations are reviewed in order to schedule the data thread for some action that is to be performed on the data unit. In one embodiment of the invention, an action may correspond to moving the data unit to a particular storage engine, changing the duration of one or more attributes of the data, destroying the data thread, etc. For example, if the action is to move the data unit to a particular storage engine, then the attributes of the data and the storage engine may be compared to determine on which storage engine the data unit should be scheduled.

In one embodiment of the invention, while the attributes are reviewed, the data scheduler may change the duration of one or more attributes to allow the action to be performed in an efficient manner. Alternatively, a user may wish to change the duration of a particular attribute. Therefore, a determination is made as whether to change the durations of one or more attributes (Step 408).

If a decision is made to change the duration, then one or more attribute durations may be changed to shorten or lengthen the active time of particular attributes (Step 410). The total duration of the data thread may also be changed. Alternatively, if the duration is not changed, then the data thread is scheduled on an appropriate storage engine (Step 412). At this stage, an action may be performed on the data unit (i.e., the data unit may be migrated, written to, read from, modified, etc.). Subsequently, when the duration of the data thread expires, the data thread and the associated data unit are destroyed (Step 414). One skilled in the art will appreciate that as the duration of various attributes expires, the attribute is destroyed (even though the data thread may still be alive).

The following examples are used to describe embodiments of the invention and are not intended to limit the scope of the application. In one embodiment of the invention, combining attributes associated with data units in the form of a data thread may be used to view data via multiple storage management devices. For example, by using data threads, as described above, different file systems may view data without moving the data from one file system to another. File systems with limited attribute capability and those with greater attribute capability may manipulate the same data while providing different views to applications and users. More specifically, a high performance application using a file system suited for high performance data (e.g., one that provides data striping and access to bigger blocks of data) may view data residing on a different file system (i.e., a file system not necessary geared toward high performance data) without moving the data.

Further, in the situation where users are performing database transactions using a database service provider that charges different rates based on the type of storage engine used, users may use data threads to customize storage engine usage. For example, users may know that database transactions are higher during business hours, and may specify high performance storage engines for limited hours of the day. Alternatively, using high performance storage engines may be cheaper during certain times, and users may wish to use reduce cost by scheduling data during these times. Once the attribute specifying the high performance storage engine expires, the data may be scheduled on low performance storage engines, allowing users to save the cost of running data on high performance storage engines for longer periods of time.

The concept of customizing storage engines may also extend to streaming media (i.e., streaming video, streaming audio). For example, after streaming media is downloaded, portions of the streaming data may need to be edited. In this case, attributes may be set in portions of data which need to be edited so that the attributes provide for the data to be scheduled on high-speed, high bandwidth storage engines. Other portions of the streaming data that do not need to be edited may be scheduled on lower speed storage engines. In this manner, data may be prioritized based on different characteristics, such as speed and bandwidth. Further, the attributes may be changed during different time periods. For example, the streaming data may only be edited during particular hours; therefore, the attribute that specifies a high-speed storage engine may expire after a certain time period. Using this method, the attributes allow the data scheduler to automatically deal with different data units more accurately.

In one embodiment of the invention, allowing attributes to define actions to more accurately be performed on data allows the quality of service of data to be specified with enhanced granularity. This is particularly useful when drafting service level agreements (SLAs) between providers of a service and users of the service. An SLA is an agreement or contract that an application service provider (ASP) provides clients. An SLA may define the technical support or business parameters that an ASP agrees to provide to clients. For example, providers of a storage management device (e.g., file system providers) may provide an SLA to users of the storage management device. Using the data thread model, complex SLAs may be simplified by prioritizing data using attributes.

Figure 5:
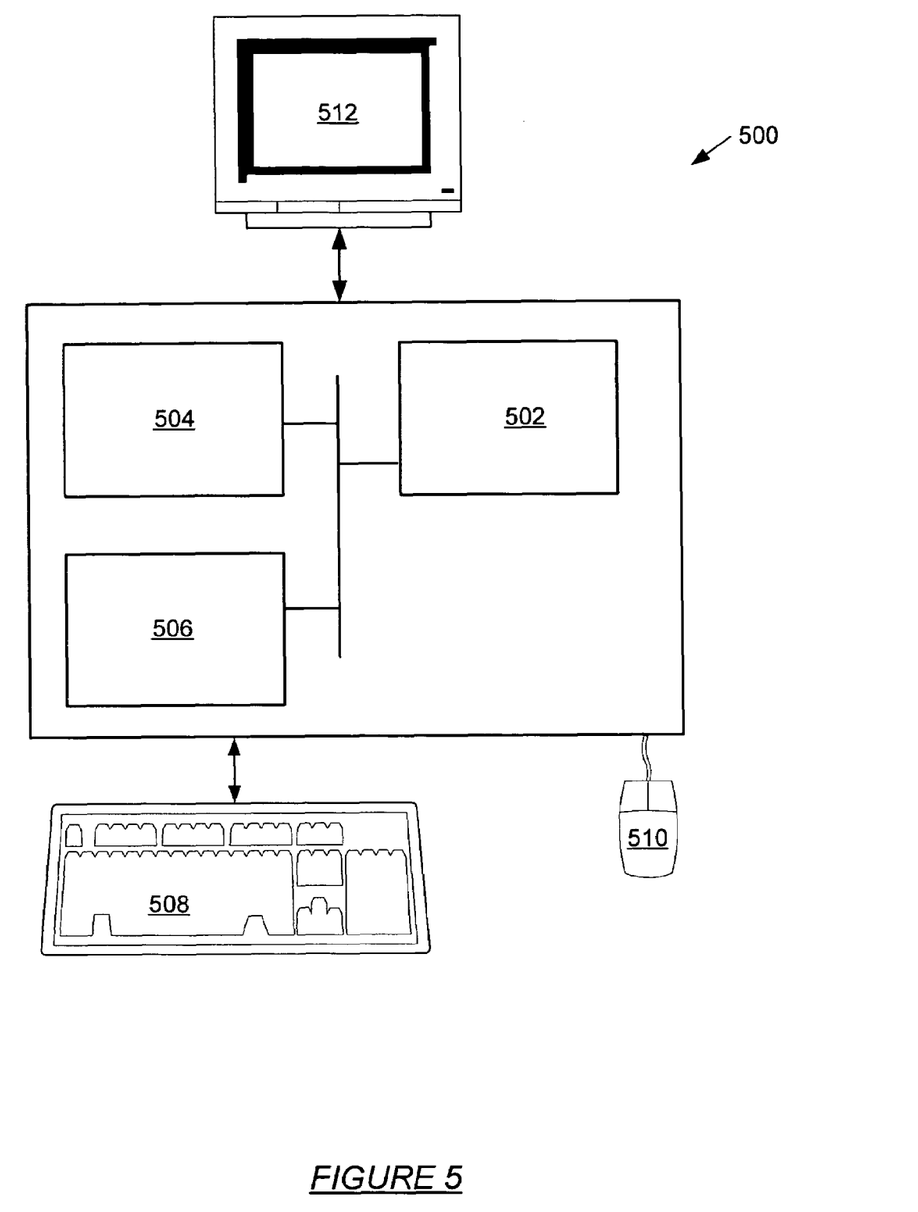
FIG. 5 shows a computer system in accordance with an embodiment of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network LAN) or a wide area network via a network interface connection (not shown). Those skilled in the art will appreciate that these input and output means may take other forms. Further, those skilled in the art will appreciate that one or more elements of the aforementioned computer (500) may be located at a remote location and connected to the other elements over a network.

Further, embodiments of the invention may be implemented on a distributed system having a plurality of nodes, where each portion of the invention (e.g., the storage management device, storage engines, data scheduler, etc.) may be located on a different node within the distributed system. In one embodiment of the invention, the node corresponds to a computer system. Alternatively, the node may correspond to a processor with associated physical memory.

Embodiments of the invention allow a method of providing fine grain service level agreements (SLA) between providers and users of storage management devices by viewing data as dynamic objects. Further, embodiments of the invention allow data attributes to remain as part of the data with which the attributes are associated. Moreover, data attributes may be added during the life of the data unit, allowing data to be characterized for various functions at different times within the life of the data unit. Additionally, by associated durations with data, embodiments of the invention provide a method to easily reclaim space within the storage management device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a plurality of storage devices each configured to store a plurality of data units;
   the plurality of data units, wherein at least one of the plurality of data units is a collection of data associated with a data thread, wherein the data thread comprises a data thread lifespan and a tuple, wherein the tuple comprises an attribute characterizing the at least one of the plurality of data units and an attribute duration associated with the attribute;
   a storage management device configured to manage the plurality of data units and each data thread associated with the plurality of data units using the plurality of storage devices; and
   a processor for executing a data scheduler configured to schedule a first action to perform on the at least one of the plurality of data units using the data thread, wherein the first action is determined based on the attribute while the attribute is alive,
   wherein the data thread lifespan is a first assigned duration of time for which the data thread is alive, and
   wherein the attribute duration is a second assigned duration of time for which the attribute is alive.

2. The system of claim 1, wherein the data thread is destroyed when the data thread lifespan expires.

3. The system of claim 1, wherein the attribute comprises one selected from the group consisting of quality of service, security, name, universal identifier, parent, and owner.

4. The system of claim 1, wherein each of the data thread lifespan and the attribute duration are changeable during the data thread lifespan.

5. The system of claim 1, wherein the data scheduler schedules the data thread on at least one of the plurality of storage devices based, at least, on one attribute.

6. The system of claim 1, wherein each of the plurality of data units comprise one selected from the group consisting of a file, a portion of a file, a file system, a block, a segment, a byte, a word, and a double word.

7. The system of claim 1, wherein each of the plurality of storage devices comprise one selected from the group consisting of a hard disk, a remote disk, a random access memory, a non-volatile random access memory, and a read-only memory.

8. The system of claim 1, wherein each of the plurality of storage devices comprises a plurality of attributes.

9. The system of claim 8, wherein the plurality of attributes comprises at least one selected from the group consisting of size, available space, and quality of service.

10. A method for using a data thread comprising:
   obtaining a data unit, wherein the data unit comprises a collection of data,
   obtaining the data thread associated with the data unit by a data scheduler, wherein the data thread comprises:
      a data thread lifespan, wherein the data thread lifespan is a first assigned duration of time for which the data thread is alive; and
      a tuple, wherein the tuple comprises an attribute characterizing the data unit and an attribute duration associated with the attribute, wherein the attribute duration is a second assigned duration of time for which the attribute is alive;
   determining, by a data scheduler on a storage management device, whether the data thread is expired using the data thread lifespan; and
   scheduling the data thread on a storage device to store on a computer readable storage medium when the data thread is not expired,
      wherein the data thread is scheduled on an appropriate storage device based, at least, on the attribute,
   wherein the data unit is stored on one of a plurality of storage devices each configured to store a plurality of data units, and
   wherein the storage management device is configured to manage the plurality of data units and each data thread associated with the plurality of data units using the plurality of storage devices.

11. The method of claim 10, further comprising:
   destroying the data thread and an associated data unit if the data thread is expired.

12. The method of claim 10, further comprising:
   changing the data thread lifespan; and
   changing the attribute duration.

13. The method of claim 10, wherein the attribute comprises at least one selected from the group consisting of quality of service, security, name, universal identifier, parent, and owner.

14. The method of claim 10, wherein the appropriate storage device comprises a plurality of attributes.

15. The method of claim 14, wherein the plurality of attributes comprises at least one selected from the group consisting of size, available space, and quality of service.

16. A storage management device for correcting an error in a first block, comprising:
- a processor;
- a memory;
- a storage device; and
- software instructions stored in the memory for enabling the computer system under control of the processor, to:
  - obtain a data unit, wherein the data unit comprises a collection of data,
  - obtain a data thread associated with the data unit by a data scheduler, wherein the data thread comprises:
    - a data thread lifespan wherein the data thread lifespan is a first assigned duration of time for which the data thread is alive, and
    - a tuple, wherein the tuple comprises an attribute characterizing the data unit and an attribute duration associated with the attribute, wherein the attribute duration is a second assigned duration of time for which the attribute is alive;
  - determine whether the data thread is expired; and
  - schedule the data thread on a storage device if the data thread is not expired,
- wherein the data thread is scheduled on the storage device based, at least, on the attribute,
- wherein the data unit is stored on one of a plurality of storage devices each configured to store a plurality of data units, and
- wherein the storage management device is configured to manage the plurality of data units and each data thread associated with the plurality of data units using the plurality of storage devices.

17. A network system having a plurality of nodes comprising:
- a plurality of storage devices configured to store a plurality of data units;
- the plurality of data units, wherein each of the plurality of data units is associated with a data thread, wherein the data thread comprises:
  - a data thread lifespan, wherein the data thread lifespan is a first assigned duration of time for which the data thread is alive, and
  - a tuple, wherein the tuple comprises an attribute characterizing at least one of the plurality of data units and an attribute duration associated with the attribute, wherein the attribute duration is a second assigned duration of time for which the attribute is alive;
- a storage management device configured to manage the plurality of data units and each data thread associated with the plurality of data units using the plurality of storage devices; and
- a processor for executing a data scheduler configured to schedule a first action to perform on the at least one of the plurality of data units using the data thread, wherein the first action is determined based on the attribute while the attribute is alive,
- wherein each of the plurality of storage devices is located on any one of the plurality of nodes, and
- wherein the data scheduler is located on any one of the plurality of nodes.

18. A plurality of nodes, comprising:
- a plurality of storage devices configured to store a plurality of data units;
- the plurality of data units, wherein at least one of the plurality of data units is associated with a data thread, wherein the data thread comprises a data thread lifespan and a tuple, wherein the tuple comprises an attribute characterizing the at least one of the plurality of data units and an attribute duration associated with the attribute;
- a storage management device configured to manage the plurality of data units and each data thread associated with the plurality of data units using the plurality of storage devices; and
- a processor for executing a data scheduler configured to schedule a first action to perform on the at least one of the plurality of data units using the data thread, wherein the first action is determined based on the attribute while the attribute is alive,
- wherein the data thread lifespan is a first assigned duration of time for which the data thread is alive,
- wherein the attribute duration corresponds to a second assigned duration of time for which the attribute is alive,
- wherein each of the plurality of data units resides on at least one of the plurality of nodes,
- wherein each of the plurality of storage devices resides on at least one of the plurality of nodes, and
- wherein the data scheduler resides on at least one of the plurality of nodes.

19. The system of claim 1, wherein the data scheduler is further configured to:
- schedule, once the attribute duration expires, a destruction of the attribute, and
- in response to the destruction of the attribute, schedule a second action to perform on the at least one of the plurality of data units using the data thread.

20. The system of claim 19, wherein the first action specifies that the at least one of the plurality of data units is accessed on a first storage device of the plurality of storage devices configured to provide an initial quality of service, and wherein the second action specifies that the at least one of the plurality of data units is accessed on a second storage device of the plurality of storage devices configured to provide a reduced quality of service.

21. The system claim 19, wherein the first action specifies that edit access is provided for the at least one of the plurality of data units, and wherein the second action specifies that restricted access is provided for the at least one of the plurality of data units.

* * * * *